United States Patent
Natsui et al.

(10) Patent No.: US 12,080,872 B2
(45) Date of Patent: Sep. 3, 2024

(54) POSITIVE ELECTRODE ACTIVE MATERIAL AND BATTERY COMPRISING THE SAME

(71) Applicant: Panasonic Intellectual Property Management Co., Ltd., Osaka (JP)

(72) Inventors: Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 969 days.

(21) Appl. No.: 17/093,552

(22) Filed: Nov. 9, 2020

(65) Prior Publication Data

US 2021/0074997 A1 Mar. 11, 2021

Related U.S. Application Data

(63) Continuation of application No. PCT/JP2019/011624, filed on Mar. 20, 2019.

(30) Foreign Application Priority Data

May 31, 2018 (JP) ................. 2018-104169

(51) Int. Cl.
*H01M 4/131* (2010.01)
*C01G 53/00* (2006.01)
*H01M 4/134* (2010.01)
*H01M 4/36* (2006.01)
*H01M 4/505* (2010.01)
*H01M 4/525* (2010.01)
*H01M 10/0525* (2010.01)
*H01M 4/02* (2006.01)

(52) U.S. Cl.
CPC ............ *H01M 4/131* (2013.01); *C01G 53/50* (2013.01); *H01M 4/134* (2013.01); *H01M 4/364* (2013.01); *H01M 4/505* (2013.01); *H01M 4/525* (2013.01); *H01M 10/0525* (2013.01); *C01P 2002/74* (2013.01); *H01M 2004/028* (2013.01)

(58) Field of Classification Search
CPC ...... H01M 4/131; H01M 4/134; H01M 4/364; H01M 4/505; H01M 4/525; H01M 10/0525; H01M 2004/028; H01M 10/0562; H01M 10/0565; C01G 53/50; C01G 53/006; C01G 45/006; C01P 2002/74; C01P 2002/72; C01P 2002/76; C01P 2006/40; Y02E 60/10
See application file for complete search history.

(56) References Cited

U.S. PATENT DOCUMENTS

| | | | | |
|---|---|---|---|---|
| 2014/0162127 A1* | 6/2014 | Kim | ...................... | H01M 4/582 |
| | | | | 427/126.3 |
| 2016/0056462 A1 | 2/2016 | Sakai et al. | | |
| 2017/0005337 A1* | 1/2017 | Ikejiri | .................... | H01M 4/364 |
| 2019/0044142 A1* | 2/2019 | Sun | ........................ | H01M 4/626 |

FOREIGN PATENT DOCUMENTS

| | | |
|---|---|---|
| EP | 2062858 A1 | 5/2009 |
| EP | 2741353 A1 | 6/2014 |
| JP | 2014-116308 A | 6/2014 |
| WO | 2014/192759 | 12/2014 |

OTHER PUBLICATIONS

The Extended European Search Report dated Jul. 5, 2021 for the related European Patent Application No. 19811631.1.
Song Jay Hyok et al: "Suppression of irreversible capacity loss in Li-rich layered oxide by fluorine doping", Journal of Power Sources, Elsevier SA, CH, vol. 313, Mar. 1, 2016 (Mar. 1, 2016), pp. 65-72, XP029474025.
International Search Report of PCT application No. PCT/JP2019/011624 dated May 7, 2019.

* cited by examiner

*Primary Examiner* — Muhammad S Siddiquee
(74) *Attorney, Agent, or Firm* — Rimon P.C.

(57) ABSTRACT

A positive electrode active material according to the present disclosure includes a lithium composite oxide that is a multiphase mixture including a first phase having a crystal structure belonging to a monoclinic crystal (e.g., space group C2/m), a second phase having a crystal structure belonging to a hexagonal crystal (e.g., space group R-3m), and a third phase having a crystal structure belonging to a cubic crystal (e.g., space group Fm-3m or space group Fd-3m). In addition, a battery according to an aspect of the present disclosure includes a positive electrode containing the positive electrode active material, a negative electrode, and an electrolyte. The positive electrode active material according to the present disclosure improves the capacity of the battery.

27 Claims, 2 Drawing Sheets

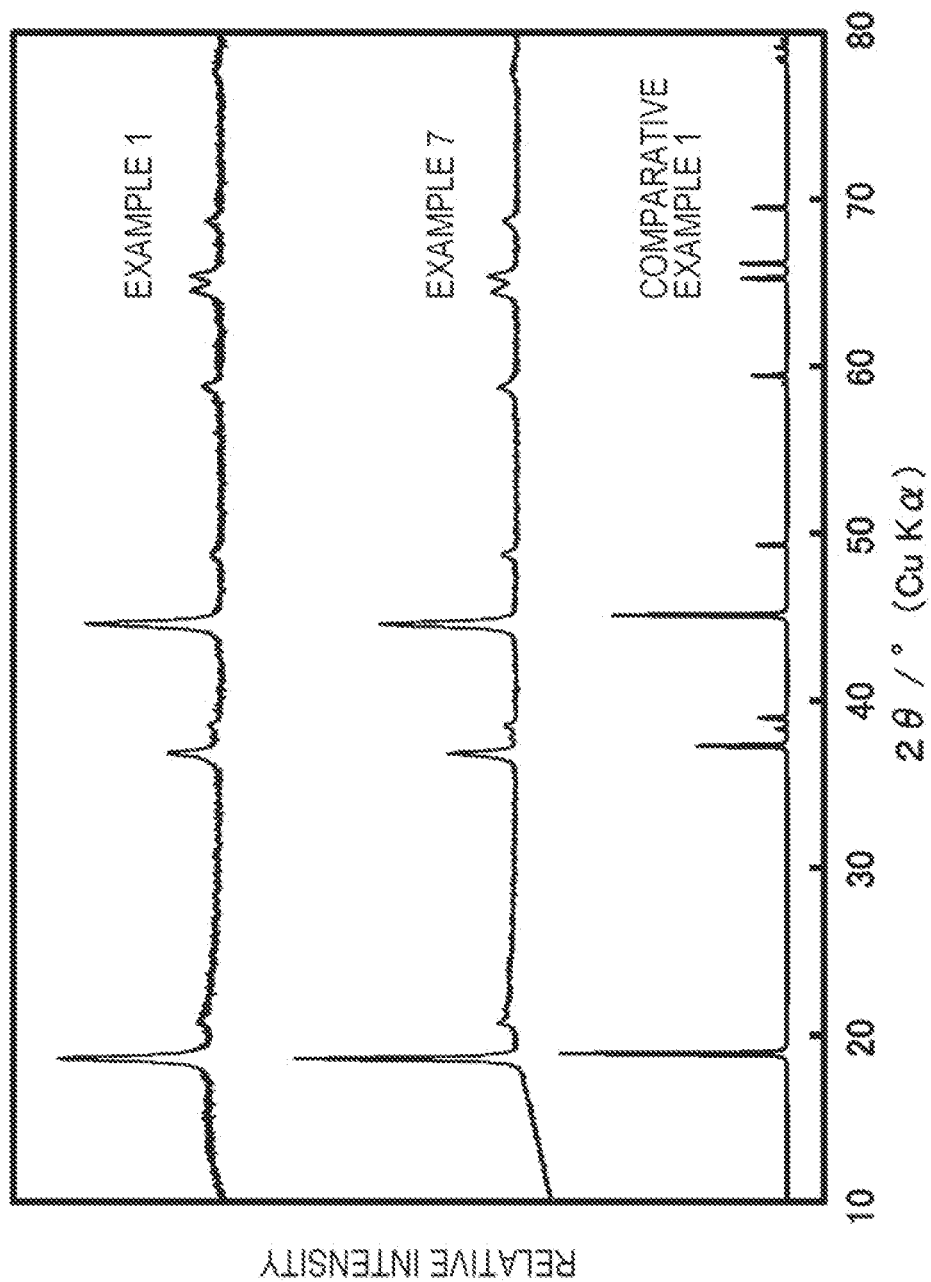

POSITIVE ELECTRODE ACTIVE MATERIAL AND BATTERY COMPRISING THE SAME

BACKGROUND

1. Technical Field

The present disclosure relates to a positive electrode active material and a battery comprising it.

2. Description of the Related Art

International Publication No. WO 2014/192759 discloses a lithium composite transition metal oxide having a chemical composition represented by a formula: $Li_aMO_x$ (here, M is an element including at least one selected from a Ni element, a Co element, and a Mn element). In an X-ray diffraction pattern of the lithium composite transition metal oxide, the ratio of the integrated intensity (I020) of the peak of a (020) plane pertaining to the crystal structure of space group C2/m to the integrated intensity (I003) of the peak of a (003) plane pertaining to the crystal structure of space group R-3m, (I020/I003), is 0.02 to 0.3.

SUMMARY

One non-limiting and exemplary embodiment provides a positive electrode active material that is used for a battery having a high capacity.

In one general aspect, the techniques disclosed here feature a positive electrode active material comprising a lithium composite oxide, wherein the lithium composite oxide is a multiphase mixture including a first phase having a crystal structure belonging to a monoclinic crystal, a second phase having a crystal structure belonging to a hexagonal crystal, and a third phase having a crystal structure belonging to a cubic crystal.

The present disclosure provides a positive electrode active material for achieving a battery having a high capacity. The present disclosure also provides a battery including a positive electrode containing the positive electrode active material, a negative electrode, and an electrolyte. The battery has a high capacity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a graph showing X-ray diffraction patterns of positive electrode active materials of Examples 1 and 7 and Comparative Example 1.

DETAILED DESCRIPTION

Figure 1:
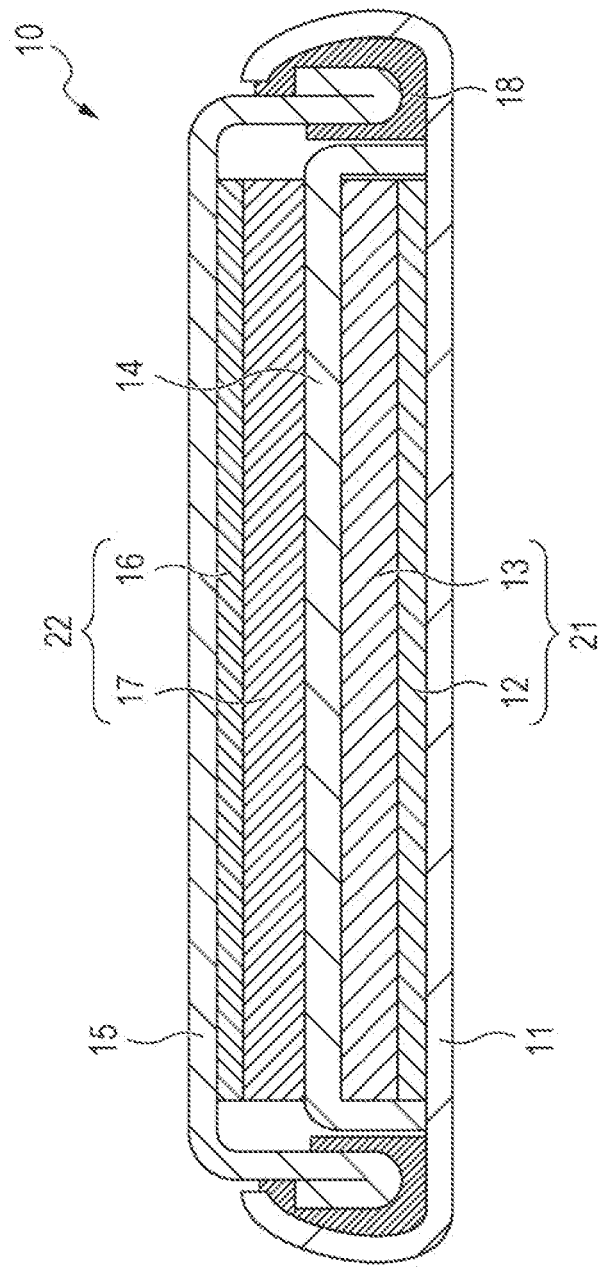
FIG. 1 illustrates a cross-sectional view of a battery 10 in Embodiment 2.

Embodiments of the present disclosure will now be described.

Embodiment 1

The positive electrode active material in Embodiment 1 contains a lithium composite oxide. The lithium composite oxide is a multiphase mixture including a first phase having a crystal structure belonging to a monoclinic crystal, a second phase having a crystal structure belonging to a hexagonal crystal, and a third phase having a crystal structure belonging to a cubic crystal.

The positive electrode active material in Embodiment 1 is used for improving the capacity of the battery.

The lithium ion battery including the positive electrode active material in Embodiment 1 has a redox potential ($Li/Li^+$ basis) of about 3.4 V. The lithium ion battery has a capacity of about 250 mAh/g or more.

A crystal structure belonging to a monoclinic crystal (for example, space group C2/m) has a structure in which a Li layer and a transition metal layer are alternately stacked. The transition metal layer may contain not only a transition metal but also Li. Accordingly, in the crystal structure belonging to a monoclinic crystal, the amount of Li that is occluded inside the crystal structure is larger than that in a known material $LiCoO_2$ which is a commonly used. However, when only a crystal structure belonging to a monoclinic crystal is used, rearrangement of atoms occurs with movement of Li in the transition metal layer. It is inferred that the rearrangement of atoms reduces the cycle characteristics of the battery.

A crystal structure belonging to a hexagonal crystal (for example, space group R-3m) has a structure in which a Li layer and a transition metal layer are alternately stacked. In the crystal structure belonging to a hexagonal crystal, since release and insertion of Li at the time of charging and discharging occur on a two-dimensional plane of the Li layer, the diffusibility of Li is high. Accordingly, it is inferred that a battery having excellent rate characteristics can be realized. However, the amount of Li in the transitional metal layer contained in the crystal structure belonging to a hexagonal crystal is low compared with that in the crystal structure belonging to a monoclinic crystal. Accordingly, it is inferred that when only a crystal structure belonging to a hexagonal crystal is used, the capacity of the battery is low.

In a crystal structure belonging to a cubic crystal (for example, space group Fm-3m or space group Fd-3m), the change in the crystal structure due to release and insertion of Li at the time of charging and discharging is small. Thus, the crystal structure belonging to a cubic crystal is rigid. Accordingly, the crystal structure belonging to a cubic crystal has excellent cycle characteristics. However, when only a crystal structure belong to a cubic crystal is used, since the amount of Li that can be contained in the crystal structure is low, it is inferred that the capacity of the battery is low.

When the lithium composite oxide in Embodiment 1 includes a first phase having a crystal structure belonging to a monoclinic crystal, a second phase having a crystal structure belonging to a hexagonal crystal, and a third phase having a crystal structure belonging to a cubic crystal, the capacity of the battery is improved by a synergistic effect of the features of these three crystal structures.

In the lithium composite oxide in Embodiment 1, the monoclinic crystal may be of space group C2/m.

The lithium composite oxide of which the monoclinic crystal is of space group C2/m further improves the capacity of the battery.

In the lithium composite oxide in Embodiment 1, the hexagonal crystal may be of space group R-3m.

The lithium composite oxide of which the hexagonal crystal is of space group R-3m further improves the capacity of the battery.

In the lithium composite oxide in Embodiment 1, the cubic crystal may be of at least one selected from the group consisting of space group Fm-3m and space group Fd-3m. That is, the third phase may have a crystal structure belonging to space group Fm-3m or space group Fd-3m. The third phase may have both a crystal structure belonging to space group Fm-3m and a crystal structure belonging to space group Fd-3m.

The lithium composite oxide of which the cubic crystal is of at least one of space group Fm-3m and space group Fd-3m further improves the capacity of the battery.

International Publication No. WO 2014/192759 discloses a lithium composite transition metal oxide. The lithium composite transition metal oxide disclosed in International Publication No. WO 2014/192759 includes space groups R-3m and C2/m, has a chemical composition represented by a formula $Li_aMO_x$ (where, M is an element including at least one selected from a Ni element, a Co element, and a Mn element), and has, in an X-ray diffraction pattern, a ratio of the integrated intensity (I020) of the peak of a (020) plane pertaining to the crystal structure of space group C2/m to the integrated intensity (I003) of the peak of a (003) plane pertaining to the crystal structure of space group R-3m, (I020/I003), of 0.02 to 0.3.

However, known technology as in International Publication No. WO 2014/192759 does not disclose or suggest the lithium composite oxide in Embodiment 1, i.e., a lithium composite oxide including all of a first phase having a crystal structure belonging to a monoclinic crystal, a second phase having a crystal structure belonging to a hexagonal crystal, and a third phase having a crystal structure belonging to a cubic crystal. That is, the lithium composite oxide in Embodiment 1 cannot be easily conceived from the known technology. The lithium composite oxide in Embodiment 1 further improves the capacity of the battery.

In the lithium composite oxide in Embodiment 1, a plurality of regions consisting of the first phase, a plurality of regions consisting of the second phase, and a plurality of regions consisting of the third phase may be randomly arranged three-dimensionally.

Since the three-dimensional random arrangement expands the three-dimensional diffusion path of Li, a larger amount of lithium can be inserted and released. As a result, the capacity of the battery is improved.

The lithium composite oxide in Embodiment 1 is a multiphase mixture. For example, a layer structure consisting of a bulk layer and a coating layer coating the bulk layer does not correspond to the multiphase mixture in the present disclosure. The multiphase mixture means a material including a plurality of phases. When the lithium composite oxide is manufactured, a plurality of materials corresponding to these phases may be mixed.

Whether a lithium composite oxide is a multiphase mixture or not can be judged by an X-ray diffraction method and an electron beam diffraction method as described later. Specifically, if the spectra of a lithium composite oxide obtained by the X-ray diffraction method and the electron beam diffraction method include peaks showing the features of a plurality of phases, the lithium composite oxide is judged to be a multiphase mixture.

In Embodiment 1, the following mathematical expression (1) may be satisfied.

$$0.08 \leq \text{integrated intensity ratio } I_{(20°\text{-}23°)}/I_{(18°\text{-}20°)} \leq 0.25 \quad \text{(I)}.$$

Here, the integrated intensity ratio $I_{(20°\text{-}23°)}/I_{(18°\text{-}20°)}$ is equal to the ratio of the integrated intensity $I_{(20°\text{-}23°)}$ to the integrated intensity $I_{(18°\text{-}20°)}$;

the integrated intensity $I_{(18°\text{-}20°)}$ is an integrated intensity of a first maximum peak present in a diffraction angle 2θ range of greater than or equal to 18° and less than or equal to 20° in an X-ray diffraction pattern of the lithium composite oxide; and the integrated intensity $I_{(20°\text{-}23°)}$ is an integrated intensity of a second maximum peak present in a diffraction angle 2θ range of greater than or equal to 20° and less than or equal to 23° in the X-ray diffraction pattern of the lithium composite oxide.

A lithium composite oxide having an integrated intensity ratio $I_{(20°\text{-}23°)}/I_{(18°\text{-}20°)}$ of greater than or equal to 0.08 and less than or equal to 0.25 further improves the capacity of the battery.

The integrated intensity ratio $I_{(20°\text{-}23°)}/I_{(18°\text{-}20°)}$ is a parameter that can be used as an index of the abundance ratio between the first phase and the second phase in the lithium composite oxide of Embodiment 1. It is inferred that the integrated intensity ratio $I_{(20°\text{-}23°)}/I_{(18°\text{-}20°)}$ increases with an increase in the abundance ratio of the first phase. In contrast, it is inferred that the integrated intensity ratio $I_{(20°\text{-}23°)}/I_{(18°\text{-}20°)}$ decreases with an increase in the abundance ratio of the second phase.

When the integrated intensity ratio $I_{(20°\text{-}23°)}/I_{(18°\text{-}20°)}$ is greater than or equal to 0.08, since the abundance ratio of the first phase is high, it is inferred that the insertion amount and the release amount of Li at the time of charging and discharging increase to improve the capacity of the battery.

When the integrated intensity ratio $I_{(20°\text{-}23°)}/I_{(18°\text{-}20°)}$ is less than or equal to 0.25, since the abundance ratio of the second phase is high, it is inferred that the diffusibility of Li increases to improve the capacity of the battery.

The integrated intensity ratio $I_{(20°\text{-}23°)}/I_{(18°\text{-}20°)}$ may be greater than or equal to 0.10 and less than or equal to 0.14.

A lithium composite oxide having an integrated intensity ratio $I_{(20°\text{-}23°)}/I_{(18°\text{-}20°)}$ of greater than or equal to 0.10 and less than or equal to 0.14 further improves the capacity of the battery.

In Embodiment 1, the following mathematical expression (II) may be satisfied.

$$0.81 \leq \text{integrated intensity ratio } I_{(18°\text{-}20°)}/I_{(43°\text{-}46°)} \leq 1.26 \quad \text{(II)}.$$

Here, the integrated intensity ratio $I_{(18°\text{-}20°)}/I_{(43°\text{-}46°)}$ is equal to the ratio of the integrated intensity $I_{(18°\text{-}20°)}$ to the integrated intensity $I_{(43°\text{-}46°)}$;

the integrated intensity $I_{(18°\text{-}20°)}$ is an integrated intensity of a first maximum peak present in a diffraction angle 2θ range of greater than or equal to 18° and less than or equal to 20° in an X-ray diffraction pattern of the lithium composite oxide; and the integrated intensity $I_{(43°\text{-}46°)}$ is an integrated intensity of a third maximum peak present in a diffraction angle 2θ range of greater than or equal to 43° and less than or equal to 46° in the X-ray diffraction pattern of the lithium composite oxide.

A lithium composite oxide having an integrated intensity ratio $I_{(18°\text{-}20°)}/I_{(43°\text{-}46°)}$ of greater than or equal to 0.81 and less than or equal to 1.26 further improves the capacity of the battery.

The integrated intensity ratio $I_{(18°\text{-}20°)}/I_{(43°\text{-}46°)}$ is a parameter that can be used as an index of the abundance ratio between the total amount of the first phase and the second phase and the third phase in the lithium composite oxide of Embodiment 1. It is inferred that the integrated intensity ratio $I_{(18°\text{-}20°)}/I_{(43°\text{-}46°)}$ increases with an increase in the abundance ratio of the total amount of the first phase and the second phase. In contrast, it is inferred that the integrated intensity ratio $I_{(18°-20°)}/I_{(43°-46°)}$ decreases with an increase in the abundance ratio of the third phase.

When the integrated intensity ratio $I_{(18°-20°)}/I_{(43°-46°)}$ is greater than or equal to 0.81, since the abundance ratio of the total amount of the first phase and the second phase is high, it inferred that the diffusibility of Li and the insertion amount and the release amount of Li at the time of charging and discharging are improved to improve the capacity of the battery.

When the integrated intensity ratio $I_{(18°-20°)}/I_{(43°-46°)}$ is less than or equal to 1.26, since the abundance ratio of the third phase is high, it is inferred that the stability of the crystal structure is enhanced to improve the capacity of the battery.

The integrated intensity ratio $I_{(18°-20°)}/I_{(43°-46°)}$ may be greater than or equal to 0.95 and less than or equal to 1.19.

A lithium composite oxide having an integrated intensity ratio $I_{(18°-20°)}/I_{(43°-46°)}$ of greater than or equal to 0.95 and less than or equal to 1.19 further improves the capacity of the battery.

The lithium composite oxide in Embodiment 1 may have both an integrated intensity ratio $I_{(20°-23°)}/I_{(18°-20°)}$ of greater than or equal to 0.08 and less $I_{(18°-20°)}/I_{(43°-46°)}$ than or equal to 0.25 and an integrated intensity ratio $I_{(18°-20°)}/I_{(43°-46°)}$ of greater than or equal to 0.81 and less than or equal to 1.26.

In a lithium composite oxide having both an integrated intensity ratio $I_{(20°-23°)}/I_{(18°-20°)}$ of greater than or equal to 0.08 and less than or equal to 0.25 and an integrated intensity ratio $I_{(18°-20°)}/I_{(43°-46°)}$ of greater than or equal to 0.81 and less than or equal to 1.26, a large amount of Li can be inserted and released while maintaining the high diffusibility of Li, and the stability of the crystal structure is high. Accordingly, such a lithium composite oxide further improves the capacity of the battery.

The integrated intensity of an X-ray diffraction peak can be calculated using, for example, the software attached to an X-ray diffractometer (for example, software including PDXL (trade name) attached to a powder X-ray diffractometer, manufactured by Rigaku Corporation). In such a case, the integrated intensity of an X-ray diffraction peak can be obtained by, for example, calculating the area from the height and the half-width of the X-ray diffraction peak.

In general, in an XRD pattern using a CuKα ray, when the crystal structure belongs to space group C2/m, the maximum peak present in a diffraction angle 2θ range of greater than or equal to 18° and less than or equal to 20° reflects a (001) plane. The maximum peak present in a diffraction angle 2θ range of greater than or equal to 20° and less than or equal to 23° reflects a (020) plane. The maximum peak present in a diffraction angle 2θ range of greater than or equal to 43° and less than or equal to 46° reflects a (114) plane.

In general, in an XRD pattern using a CuKα ray, when the crystal structure belongs to space group R-3m, the maximum peak present in a diffraction angle 2θ range of greater than or equal to 18° and less than or equal to 20° reflects a (003) plane. No diffraction peak is present in a diffraction angle 2θ range of greater than or equal to 20° and less than or equal to 23°. The maximum peak present in a diffraction angle 2θ range of greater than or equal to 43° and less than or equal to 46° reflects a (104) plane.

In general, in an XRD pattern using a CuKα ray, when the crystal structure belongs to space group Fm-3m, no diffraction peak is present in a diffraction angle 2θ range of greater than or equal to 18° and less than or equal to 20°. No diffraction peak is present in a diffraction angle 2θ range of greater than or equal to 20° and less than or equal to 23°. The maximum peak present in a diffraction angle 2θ range of greater than or equal to 43° and less than or equal to 46° reflects a (200) plane.

In general, in an XRD pattern using a CuKα ray, when the crystal structure belongs to a cubic crystal, for example, space group Fd-3m, the maximum peak present in a diffraction angle 2θ range of greater than or equal to 18° and less than or equal to 20° reflects a (111) plane. No diffraction peak is present in a diffraction angle 2θ range of greater than or equal to 20° and less than or equal to 23°. The maximum peak present in a diffraction angle 2θ range of greater than or equal to 43° and less than or equal to 46° reflects a (400) plane.

The lithium composite oxide in Embodiment 1 includes, for example, a first phase having a crystal structure belonging to space group C2/m, a second phase having a crystal structure belonging to space group R-3m, and a third phase having a crystal structure belonging to space group Fm-3m or Fd-3m.

Since the lithium composite oxide of Embodiment 1 includes three phases, there is a problem that it is not always easy to completely specify the space groups and the plane indices reflected by the maximum peak present in the diffraction angle 2θ range of greater than or equal to 18° and less than or equal to 20° and the maximum peak present in a diffraction angle 2θ range of greater than or equal to 43° and less than or equal to 46°, respectively, in the lithium composite oxide of Embodiment 1.

In order to solve this problem, in addition to the above-described X-ray diffraction measurement, electron beam diffraction measurement using a transmission electron microscope (hereinafter, "TEM") may be performed. A space group of the lithium composite oxide in Embodiment 1 can be specified by observing an electron beam diffraction pattern by a known procedure. Thus, it can be verified that the lithium composite oxide in Embodiment 1 includes a first phase having a crystal structure belonging to a monoclinic crystal, a second phase having a crystal structure belonging to a hexagonal crystal, and a third phase having a crystal structure belonging to a cubic crystal.

The lithium composite oxide in Embodiment 1 may be a three-phase mixture composed of a first phase, a second phase, and a third phase.

The three-phase mixture improves the capacity of the battery.

The lithium composite oxide in Embodiment 1 contains not only a lithium atom but also an atom other than the lithium atom. Examples of the atom other than the lithium atom are Mn, Co, Ni, Fe, Cu, V, Nb, Mo, Ti, Cr, Zr, Zn, Na, K, Ca, Mg, Pt, Au, Ag, Ru, W, B, Si, P, and Al. The lithium composite oxide in Embodiment 1 may contain one type of atom as the atom other than lithium atom. Alternatively, the lithium composite oxide in Embodiment 1 may contain two or more types of atom as the atom other than lithium atom.

The atom other than lithium atom can be selected from the group consisting of Mn, Co, Ni, Fe, Cu, V, Nb, Ti, Cr, Ru, W, B, Si, P, and Al.

The lithium composite oxide containing an atom other than lithium atom further improves the capacity of the battery.

The lithium composite oxide in Embodiment 1 may contain at least one 3d transition metal element selected from the group consisting of Mn, Co, Ni, Fe, Cu, V, Ti, Cr, and Zn.

The lithium composite oxide containing a 3d transition metal element further improves the capacity of the battery.

The atom other than lithium atom can be selected from the group consisting of Mn, Co, and Ni.

The lithium composite oxide containing an atom selected from the group consisting of Mn, Co, and Ni further improves the capacity of the battery.

The lithium composite oxide in Embodiment 1 may contain Mn.

Since the orbital hybridization of Mn and oxygen is easily formed, oxygen release at the time of charging is suppressed. As described above, in the crystal structure including the first phase, the second phase, and the third phase, the crystal structure is further stabilized. It is inferred that, consequently, a larger amount of Li can be inserted and released. Accordingly, the capacity of the battery can be improved.

The lithium composite oxide in Embodiment 1 may contain at least one element selected from the group consisting of F, Cl, N, and S. Such at least one element stabilizes the crystal structure of the lithium composite oxide.

A part of the oxygen atoms of the lithium composite oxide may be substituted with an electrochemically inert anion. In other words, a part of oxygen atoms may be substituted with at least one anion selected from the group consisting of F, Cl, N, and S. It is inferred that this substitution further stabilizes the crystal structure of the lithium composite oxide in Embodiment 1. It is inferred that the crystal lattice is expanded by substituting a part of oxygen with an anion having an ionic radius larger than the radius of an oxygen anion to improve the diffusibility of Li. An example of the anion having an ionic radius larger than the radius of an oxygen anion is at least one anion selected from the group consisting of F, Cl, N, and S. As described above, in the crystal structure including the first phase, the second phase, and the third phase, the crystal structure is further stabilized. It is inferred that, consequently, a larger amount of Li can be inserted and released. Thus, the capacity of the battery is improved.

The lithium composite oxide in Embodiment 1 may contain F.

Since a fluorine atom has high electronegativity, the substitution of a part of oxygen with a fluorine atom increases the interaction between a cation and an anion to improve the discharge capacity or the operating voltage. For the same reason, electrons are localized due to solid solution of F compared with the case of not containing F. Consequently, the oxygen release at the time of charging is suppressed to stabilize the crystal structure. As described above, in the crystal structure including the first phase, the second phase, and the third phase, the crystal structure is further stabilized. Consequently, a larger amount of Li can be inserted and released. The capacity of the battery is further improved by the total action of these effects.

Subsequently, an example of the chemical composition of a lithium composite oxide in Embodiment 1 will now be described.

An average composition of the lithium composite oxide in Embodiment 1 may be represented by the following compositional formula (1): $Li_xMe_yO_\alpha Q_\beta$, where, Me is at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al; and Q is at least one selected from the group consisting of F, Cl, N, and S.

In the compositional formula (1), the following mathematical expressions:

$1.05 \leq x \leq 1.5$, $0.6 \leq y \leq 1.0$, $1.2 \leq \alpha \leq 2.0$, and $0 \leq \beta \leq 0.8$ can be satisfied.

The above-mentioned lithium composite oxide improves the capacity of the battery.

When Me is represented by a chemical formula $Me'_{y1}Me''_{y2}$ (here, Me' and Me'' are each independently at least one selected from the group for Me), "y=y1+y2" is satisfied. For example, when Me is $Mn_{0.6}Co_{0.2}$, "y=0.6+0.2=0.8" is satisfied. Even if Q is composed of two or more elements, it is possible to calculate as in Me.

When x is a value of greater than or equal to 1.05, the amount of Li that can be inserted and released in the positive electrode active material is large.

Accordingly, the capacity is improved.

When x is a value of less than or equal to 1.5, the amount of Li that is inserted and released in the positive electrode active material by the redox reaction of Me is large. As a result, there is no need to highly utilize the redox reaction of oxygen. Consequently, the crystal structure is stabilized, resulting in an improvement in the capacity.

When y is a value of greater than or equal to 0.6, the amount of Li that is inserted and released in the positive electrode active material by the redox reaction of Me is large. As a result, there is no need to highly utilize the redox reaction of oxygen. Consequently, the crystal structure is stabilized, resulting in an improvement in the capacity.

When y is a value of less than or equal to 1.0, the amount of Li that can be inserted and released in the positive electrode active material is large. Consequently, the capacity is improved.

When $\alpha$ is a value of greater than or equal to 1.2, the charge compensation amount can be prevented from decreasing by the redox of oxygen. Consequently, the capacity is improved.

When $\alpha$ is a value of less than or equal to 2.0, the capacity can be prevented from becoming excessive by the redox of oxygen, and the crystal structure when Li is released is stabilized. Consequently, the capacity is improved.

When $\beta$ is a value of less than or equal to 0.8, since it is possible to prevent the electrochemically inert influence of Q from increasing, the electron conductivity is improved. Consequently, the capacity is improved.

The "average composition" of the lithium composite oxide in Embodiment 1 is a composition obtained by analyzing the elements of the lithium composite oxide without considering the difference in the composition of each phase of the lithium composite oxide. Typically, it means the composition obtained by elemental analysis using a sample having a size similar to or larger than that of a primary particle of the lithium composite oxide. The first phase, the second phase, and the third phase may have the same chemical composition with each other. Alternatively, the first phase, the second phase, and the third phase may have different compositions from each other.

The above-described average composition can be determined by inductively coupled plasma emission spectrometry, inert gas fusion-infrared absorption analysis, ion chromatography, or a combination thereof.

In order to improve the capacity of the battery, in the compositional formula (1), Me may include at least one selected from the group consisting of Mn, Co, Ni, Fe, Cu, V, Nb, Ti, Cr, Ru, W, B, Si, P, and Al.

In order to improve the capacity of the battery, in the compositional formula (1), Me may include at least one 3d transition metal element selected from the group consisting of Mn, Co, Ni, Fe, Cu, V, Ti, Cr, and Zn.

In order to improve the capacity of the battery, Me may include at least one selected from the group consisting of Mn, Co, and Ni.

In the compositional formula (1), Me may include Mn. That is, Me may be Mn.

Alternatively, Me may include not only Mn but also at least one selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al.

As already described, since the orbital hybridization of Mn and oxygen is easily formed, oxygen release at the time of charging is suppressed. In the crystal structure including the first phase, the second phase, and the third phase, the crystal structure is further stabilized. It is inferred that, consequently, a larger amount of Li can be inserted and released. Consequently, the capacity of the battery can be improved.

In the compositional formula (1), the molar percentage of Mn in Me may be greater than or equal to 60%. That is, the molar ratio of Mn to the entire Me including Mn (i.e., molar ratio of Mn/Me) may be greater than or equal to 0.6 and less than or equal to 1.0.

As already described, since the orbital hybridization of Mn and oxygen is easily formed, oxygen release at the time of charging is suppressed. In the crystal structure including the first phase, the second phase, and the third phase, the crystal structure is further stabilized. It is inferred that, consequently, a larger amount of Li can be inserted and released. Consequently, the capacity of the battery can be improved.

In the compositional formula (1), Me may include at least one element selected from the group consisting of B, Si, P, and Al in such a manner that the molar percentage of the at least one element in Me is less than or equal to 20%.

Since B, Si, P, and Al have high covalency, the crystal structure of the lithium composite oxide in Embodiment 1 is stabilized. As a result, the cycle characteristics are improved, and the life of the battery can be further extended.

The following two mathematical expressions:

$$1.166 \leq x \leq 1.4, \text{ and}$$

$$0.67 \leq y \leq 1.0$$

may be satisfied.

When the above two mathematical expressions are satisfied, the capacity of the battery can be further improved.

The following two mathematical expressions:

$$1.33 \leq \alpha \leq 2.0, \text{ and}$$

$$0 \leq \beta \leq 0.67$$

may be satisfied.

When the above two mathematical expressions are satisfied, the capacity of the battery can be further improved.

The following mathematical expression:

$$0 < \beta \leq 0.67$$

may be satisfied.

When the above mathematical expression is satisfied, the capacity of the battery can be further improved.

The lithium composite oxide represented by the compositional formula (1) may contain Q (i.e., at least one selected from the group consisting of F, C, N, and S). The at least one element stabilizes the crystal structure of the lithium composite oxide.

A part of oxygen atoms of the lithium composite oxide may be substituted with an electrochemically inert anion. In other words, a part of oxygen atoms may be substituted with at least one anion selected from the group consisting of F, Cl, N, and S. It is inferred that this substitution further stabilizes the crystal structure of the lithium composite oxide represented by the compositional formula (1). It is inferred that the crystal lattice is expanded by substituting a part of oxygen with an anion having an ionic radius larger than the radius of an oxygen anion to improve the diffusibility of Li. As described above, in the crystal structure including the first phase, the second phase, and the third phase, the crystal structure is further stabilized. It is inferred that, consequently, a larger amount of Li can be inserted and released. Thus, the capacity of the battery is improved.

Q may include F.

That is, Q may be F.

Alternatively, Q may include not only F but also at least one element selected from the group consisting of Cl, N, and S.

Since a fluorine atom has high electronegativity, the substitution of apart of oxygen with a fluorine atom increases the interaction between a cation and an anion to improve the discharge capacity or the operating voltage. For the same reason, electrons are localized due to solid solution of F compared with the case of not containing F. Consequently, the oxygen release at the time of charging is suppressed to stabilize the crystal structure. As described above, in the crystal structure including the first phase, the second phase, and the third phase, the crystal structure is further stabilized. Consequently, a larger amount of Li can be inserted and released. The capacity of the battery is further improved by the total action of these effects.

The following two mathematical expressions:

$$1.33 \leq \alpha \leq 1.9, \text{ and}$$

$$0.1 \leq \beta \leq 0.67$$

may be satisfied.

When the above two mathematical expressions are satisfied, the capacity of the battery can be further improved.

When the above two mathematical expressions are satisfied, the capacity can be prevented from becoming excessive due to the redox of oxygen. As a result, the influence of the electrochemically inert Q is sufficiently shown to maintain the stability of the crystal structure, even when Li is released. Thus, the capacity of the battery can be further improved.

The molar ratio of Li to Me is represented by a mathematical expression (x/y).

The molar ratio (x/y) may be greater than or equal to 1.4 and less than or equal to 2.0.

A molar ratio (x/y) of greater than or equal to 1.4 and less than or equal to 2.0 further improves the capacity of the battery.

When the molar ratio (x/y) is higher than 1, for example, the ratio of the number of Li atoms in the lithium composite oxide in Embodiment 1 is higher than the ratio of the number of Li atoms in the known positive electrode active material represented by a compositional formula $LiMnO_2$. Accordingly, it is possible to insert and release a larger amount of Li.

When the molar ratio (x/y) is greater than or equal to 1.4, since the amount of Li that can be used is large, a diffusion path of Li is appropriately formed. Accordingly, when the molar ratio (x/y) is greater than or equal to 1.4, the capacity of the battery is further improved.

When the molar ratio (x/y) is less than or equal to 2.0, it is possible to prevent the redox reaction of usable Me from decreasing. As a result, there is no need to highly utilize the redox reaction of oxygen. A decrease in the Li insertion efficiency at the time of discharging, due to destabilization of the crystal structure when Li is released at the time of charging, is suppressed. Accordingly, the capacity of the battery is further improved.

In order to further improve the capacity of the battery, the molar ratio (x/y) may be greater than or equal to 1.4 and less than or equal to 1.5.

The molar ratio of O to Q is represented by a mathematical expression ($\alpha/\beta$).

In order to further improve the capacity of the battery, the molar ratio ($\alpha/\beta$) may be greater than or equal to 2 and less than or equal to 19.

When the molar ratio ($\alpha/\beta$) is greater than or equal to 2, the charge compensation amount can be prevented from decreasing due to the redox of oxygen. Furthermore, since the influence of the electrochemically inert Q can be reduced, the electron conductivity is improved. Accordingly, the capacity of the battery is further improved.

When the molar ratio ($\alpha/\beta$) is less than or equal to 19, the capacity can be prevented from becoming excessive due to the redox of oxygen. Consequently, the crystal structure is stabilized when Li is released. Furthermore, the influence of the electrochemically inert Q is shown to stabilize the crystal structure when Li is released. Accordingly, a battery having a higher capacity can be realized.

As described above, the lithium composite oxide in Embodiment 1 may have an average composition represented by a compositional formula $Li_xMe_yO_\alpha Q_\beta$. Accordingly, the lithium composite oxide in Embodiment 1 is composed of a cationic portion and an anionic portion. The cationic portion is composed of Li and Me. The anionic portion is composed of O and Q. The molar ratio of the cationic portion composed of Li and Me to the anionic portion composed of O and Q is represented by a mathematical expression $((x+y)/(\alpha+\beta))$.

The molar ratio $((x+y)/(\alpha+\beta))$ may be greater than or equal to 0.75 and less than or equal to 1.2.

A molar ratio $((x+y)/(\alpha+\beta))$ of greater than or equal to 0.75 and less than or equal to 1.2 further improves the capacity of the battery.

When the molar ratio $((x+y)/(\alpha+\beta))$ is greater than or equal to 0.75, it is possible to prevent that a large amount of impurities are generated when the lithium composite oxide is synthesized, and the capacity of the battery is further improved.

When the molar ratio $((x+y)/(\alpha+\beta))$ is less than or equal to 1.2, since the amount of defect in the anionic portion of the lithium composite oxide is low, the crystal structure is stably maintained even after lithium is desorbed from the lithium composite oxide by charging.

The molar ratio $((x+y)/(\alpha/\beta))$ may be greater than or equal to 1.0 and less than or equal to 1.2.

A molar ratio $((x+y)(\alpha/\beta))$ of greater than or equal to 1.0 and less than or equal to 1.2 further improves the capacity of the battery.

In the lithium composite oxide in Embodiment 1, apart of Li may be substituted with an alkaline metal such as Na or K.

The positive electrode active material in Embodiment 1 may contain the above-described lithium composite oxide as a main component. In other words, the positive electrode active material in Embodiment 1 may contain the lithium composite oxide such that the mass percentage of the lithium composite oxide in the whole positive electrode active material is greater than or equal to 50%. Such a positive electrode active material further improves the capacity of the battery.

In order to further improve the capacity of the battery, the mass percentage may be greater than or equal to 70%.

In order to further improve the capacity of the battery, the mass percentage may be greater than or equal to 90%.

The positive electrode active material in Embodiment 1 may contain not only the above-described lithium composite oxide but also inevitable impurities.

The positive electrode active material in Embodiment 1 may contain the starting material as an unreacted material. The positive electrode active material in Embodiment 1 may contain a by-product occurring when the lithium composite oxide is synthesized. The positive electrode active material in Embodiment 1 may contain a decomposition product generated by decomposition of the lithium composite oxide.

The positive electrode active material in Embodiment 1 may contain only the lithium composite oxide except for inevitable impurities.

The positive electrode active material containing only the lithium composite oxide further improves the capacity of the battery.

Method for Producing Lithium Composite Oxide

An example of a method for manufacturing a lithium composite oxide contained in the positive electrode active material of Embodiment 1 will now be described.

The lithium composite oxide in Embodiment 1 is produced by, for example, the following method.

A raw material including Li, a raw material including Me, and a raw material including Q are prepared.

Examples of the raw material including Li include lithium oxides, such as $Li_2O$ and $Li_2O_2$; lithium salts, such as LiF, $Li_2CO_3$, and LiOH; and lithium composite oxides, such as $LiMeO_2$ and $LiMe_2O_4$.

Examples of the raw material including Me include metal oxides, such as $Me_2O_3$; metal salts, such as $MeCO_3$ and $MeNO_3$; metal hydroxides, such as $Me(OH)_2$ and MeOOH; and lithium composite oxides, such as $LiMeO_2$ and $LiMe_2O_4$.

For example, when Me is Mn, examples of the raw material including Mn include manganese oxides, such as $MnO_2$ and $Mn_2O3$; manganese salts, such as $MnCO_3$ and $MnNO_3$; manganese hydroxides, such as $Mn(OH)_2$ and MnOOH; and lithium manganese composite oxides, such as $LiMnO_2$ and $LiMn_2O_4$.

Examples of the raw material including Q include halogenated lithium, transition metal halides, transition metal sulfides, and transition metal nitrides.

When Q is F, examples of the raw material including F include LiF and transition metal fluorides.

These raw materials are weighed, for example, such that the amount of Li is 0.8 times the molar ratio shown in the above-mentioned compositional formula (1).

The raw materials are mixed by, for example, a dry method or a wet method and are then mechanochemically reacted with each other in a mixer, such as a planetary ball mill, for longer than or equal to 10 hours to obtain a compound (i.e., a precursor of a lithium composite oxide).

Subsequently, a raw material including Li (for example, LiOH) is further added to the resulting compound, followed by heat treatment. Consequently, a lithium composite oxide in Embodiment 1 is obtained.

Thus, the values of x, y, $\alpha$, and $\beta$ can be changed within the ranges shown in the compositional formula (I).

The conditions of the heat treatment are appropriately set such that the lithium composite oxide in Embodiment 1 is obtained. Although the optimum conditions of the heat treatment vary depending on other manufacturing conditions and the target composition, the present inventors have found that the values of the integrated intensity ratio $I_{(18°-20°)}/I_{(46°-46°)}$ and the integrated intensity ratio $I_{(20°-23°)}/I_{(18°-20°)}$ tend to increase with, for example, an increase in the temperature of the heat treatment, an increase in the time for the heat treatment, or a decrease in the oxygen partial pressure during the heat treatment. Furthermore, the present inventors have found that the value of the integrated intensity ratio $I_{(18°-20°)}/I_{(43°-46°)}$ tends to increase with an increase in the amount of Li added before the heat treatment. A manufacturer can determine the conditions of the heat treatment using these tendencies as a guide. The temperature and the time of the heat treatment may be selected from, for example, a range of 200° C. to 900° C. and a range of 1 minute to 20 hours, respectively. Examples of the atmosphere of the heat treatment are an air atmosphere, an oxygen atmosphere, and an inert atmosphere (for example, a nitrogen atmosphere or an argon atmosphere).

As described above, the lithium composite oxide in Embodiment 1 can be obtained by adjusting the raw materials, the conditions for mixing the raw materials, and the conditions for heat treatment.

The space group of the crystal structure of a resulting lithium composite oxide can be specified by, for example, X-ray diffraction measurement or electron beam diffraction measurement. Consequently, it can be verified that the resulting lithium composite oxide includes, for example, a first phase having a crystal structure belonging to a monoclinic crystal, a second phase having a crystal structure belonging to a hexagonal crystal, and a third phase having a crystal structure belonging to a cubic crystal.

The average composition of a resulting lithium composite oxide can be determined by, for example, ICP emission spectrometry, inert gas fusion-infrared absorption analysis, ion chromatography, or a combination thereof.

When a lithium-transition metal composite oxide is used as a raw material, the energy of mixing the elements can be decreased. Consequently, the purity of the lithium composite oxide in Embodiment 1 is increased.

As described above, the method for manufacturing a lithium composite oxide of Embodiment 1 includes a step (a) of preparing raw materials, a step (b) of mechanochemically reacting the raw materials to obtain a precursor of the lithium composite oxide, and a step (c) of heat-treating the precursor to obtain a lithium composite oxide.

The raw materials may be a raw material mixture. In the raw material mixture, the ratio of Li to Me may be greater than or equal to 1.4 and less than or equal to 2.0.

In the step (a), a raw material mixture may be prepared by mixing raw materials such that the molar ratio of Li to Me is greater than or equal to 1.4 and less than or equal to 1.5.

In the step (b), a ball mill may be used for the mechanochemical reaction.

As described above, in order to obtain the lithium composite oxide in Embodiment 1, raw materials (for example, LiF, $Li_2$, a transition metal oxide, or a lithium composite oxide) may be mixed by a mechanochemical reaction using a planetary ball mill.

Embodiment 2

Embodiment 2 will now be described. The items described in Embodiment 1 can be appropriately omitted.

The battery in Embodiment 2 includes a positive electrode containing the above-described positive electrode active material in Embodiment 1, a negative electrode, and an electrolyte.

The battery in Embodiment 2 has a high capacity.

In the battery in Embodiment 2, the positive electrode may include a positive electrode active material layer. The positive electrode active material layer may contain the positive electrode active material in Embodiment 1 as a main component. That is, the mass percentage of the positive electrode active material in the whole positive electrode active material layer is greater than or equal to 50%.

Such a positive electrode active material layer further improves the capacity of the battery.

The mass percentage may be greater than or equal to 70%.

Such a positive electrode active material layer further improves the capacity of the battery.

The mass percentage may be greater than or equal to 90%.

Such a positive electrode active material layer further improves the capacity of the battery.

The battery in Embodiment 2 is, for example, a lithium-ion secondary battery, a nonaqueous electrolyte secondary battery, or an all-solid-state battery.

In the battery in Embodiment 2, the negative electrode may contain a negative electrode active material that can occlude and release lithium ions. Alternatively, the negative electrode may contain a material where lithium metal is dissolved from the material into an electrolyte at the time of discharging and precipitates on the material at the time of charging.

In the battery in Embodiment 2, the electrolyte may be a nonaqueous electrolyte (for example, nonaqueous electrolyte solution).

In the battery in Embodiment 2, the electrolyte may be a solid electrolyte.

FIG. 1 shows a cross-sectional view of a battery 10 in Embodiment 2.

As shown in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with, for example, a nonaqueous electrolyte (for example, a nonaqueous electrolyte solution).

The positive electrode 21, the negative electrode 22, and the separator 14 form an electrode group.

The electrode group is accommodated in the case 11.

The case 11 is sealed with the gasket 18 and the sealing plate 15.

The positive electrode 21 includes a positive electrode current collector 12 and a positive electrode active material layer 13 disposed on the positive electrode current collector 12.

The positive electrode current collector 12 is made of, for example, a metal material (for example, at least one selected from the group consisting of aluminum, stainless steel, nickel, iron, titanium, copper, palladium, gold, and platinum) or an alloy thereof.

The positive electrode current collector 12 may not be provided. In such a case, the case 11 is used as a positive electrode current collector.

The positive electrode active material layer 13 includes the positive electrode active material in Embodiment 1.

The positive electrode active material layer 13 may contain an additive (conductive agent, ionic conductivity auxiliary agent, or binding agent) as needed.

The negative electrode 22 includes a negative electrode current collector 16 and a negative electrode active material layer 17 disposed on the negative electrode current collector 16.

The negative electrode current collector 16 is made of, for example, a metal material (for example, at least one selected from the group consisting of aluminum, stainless steel, nickel, iron, titanium, copper, palladium, gold, and platinum) or an alloy thereof.

The negative electrode current collector 16 may not be provided. In such a case, the sealing plate 15 is used as a negative electrode current collector.

The negative electrode active material layer 17 contains a negative electrode active material.

The negative electrode active material layer 17 may contain an additive (conductive agent, ionic conductivity auxiliary agent, or binding agent) as needed.

Examples of the material of the negative electrode active material are metal materials, carbon materials, oxides, nitrides, tin compounds, and silicon compounds.

The metal material may be a single metal. Alternatively, the metal material may be an alloy. Examples of the metal material include lithium metal and lithium alloys.

Examples of the carbon material include natural graphite, coke, graphitizing carbon, carbon fibers, spherical carbon, artificial graphite, and amorphous carbon.

From the viewpoint of capacity density, as the negative electrode active material, silicon (i.e., Si), tin (i.e., Sn), a silicon compound, or a tin compound can be used. The silicon compound and the tin compound may be alloys or solid solutions.

As an example of the silicon compound, $SiO_x$ (here, $0.05<x<1.95$) is mentioned. A compound obtained by substituting a part of silicon atoms of $SiO_x$ with another element can also be used. Such a compound is an alloy or a solid solution. The element as another element is at least one element selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (here, $0<x<2$), $SnO_2$, and $SnSiO_3$. One tin compound selected from these compounds may be used alone. Alternatively, a combination of two or more tin compounds selected from these compounds may be used.

The shape of the negative electrode active material is not limited. As the negative electrode active material, a negative electrode active material having a known shape (e.g., particulate or fibrous shape) can be used.

The method for filling (i.e., occluding) the negative electrode active material layer 17 with lithium is not limited. Specifically, examples of the method are a method (a) in which lithium is deposited on a negative electrode active material layer 17 by a gas phase method, such as a vacuum evaporation method, and a method (b) in which lithium metal foil and a negative electrode active material layer 17 are brought into contact with each other and are then heated. In both methods, lithium is diffused in the negative electrode active material layer 17 by heat. A method in which lithium is electrochemically occluded in the negative electrode active material layer 17 can also be used. Specifically, a battery is assembled using a negative electrode 22 not including lithium and lithium metal foil (negative electrode). Subsequently, the battery is charged such that the negative electrode 22 occludes lithium.

Examples of the binding agents of the positive electrode 21 and the negative electrode 22 are polyvinylidene fluoride, polytetrafluoroethylene, polyethylene, polypropylene, an aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene butadiene rubber, and carboxymethyl cellulose.

Other examples of the binding agent are copolymers of two or more materials selected from the group consisting of tetrafluoroethylene, hexafluoroethane, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. A mixture of two or more binding agents selected from the above-mentioned materials may be used.

Examples of the conductive agents of the positive electrode 21 and the negative electrode 22 are graphite, carbon black, a conductive fiber, graphite fluoride, metal powder, a conductive whisker, a conductive metal oxide, and an organic conductive material.

Examples of the graphite include natural graphite and artificial graphite.

Examples of the carbon black include acetylene black, ketjen black, channel black, furnace black, lamp black, and thermal black.

Examples of the metal powder include aluminum powder.

Examples of the conductive whisker include a zinc oxide whisker and a potassium titanate whisker.

Examples of the conductive metal oxide include titanium oxide.

Examples of the organic conductive material include a phenylene derivative.

The surface of the binding may be at least partially coated with a conductive agent. For example, the surface of the binding agent may be coated with carbon black. Consequently, the capacity of the battery can be improved.

The material of the separator 14 is a material having high ion permeability and sufficient mechanical strength. Examples of the material of the separator 14 include a microporous thin film, woven fabric, and nonwoven fabric. Specifically, the separator 14 is desirably made of polyolefin, such as polypropylene or polyethylene. The separator 14 made of polyolefin not only has excellent durability but also can show a shutdown function when excessively heated. The thickness of the separator 14 is within a range of, for example, 10 to 300 pm (or 10 to 40 pm). The separator 14 may be a monolayer film made of a single material. Alternatively, the separator 14 may be a composite film (or multilayer film) made of two or more materials. The porosity of the separator 14 is within a range of, for example, 30% to 70% (or 35% to 60%). The term "porosity" means the percentage of the volume of holes in the total volume of the separator 14. The porosity is measured by, for example, a mercury intrusion method.

The nonaqueous electrolyte solution includes a nonaqueous solvent and a lithium salt dissolved in the nonaqueous solvent.

Examples of the nonaqueous solvent are a cyclic carbonate ester solvent, a chain carbonate ester solvent, a cyclic ether solvent, a chain ether solvent, a cyclic ester solvent, a chain ester solvent, and a fluorine solvent.

Examples of the cyclic carbonate ester solvent are ethylene carbonate, propylene carbonate, and butylene carbonate.

Examples of the chain carbonate ester solvent are dimethyl carbonate, ethyl methyl carbonate, and diethyl carbonate.

Examples of the cyclic ether solvent are tetrahydrofuran, 1,4-dioxane, and 1,3-dioxolane.

Examples of the chain ether solvent are 1,2-dimethoxyethane and 1,2-diethoxyethane.

An example of the cyclic ester solvent is γ-butyrolactone.

An example of the chain ester solvent is methyl acetate.

Examples of the fluorine solvent are fluoroethylene carbonate, methyl fluoropropionate, fluorobenzene, fluoroethyl methyl carbonate, and fluorodimethylene carbonate.

As the nonaqueous solvent, one nonaqueous solvent selected from these solvents can be used alone. Alternatively, as the nonaqueous solvent, a combination of two or more nonaqueous solvents selected from these solvents can be used.

The nonaqueous electrolyte solution may contain at least one fluorine solvent selected from the group consisting of fluoroethylene carbonate, methyl fluoropropionate, fluorobenzene, fluoroethyl methyl carbonate, and fluorodimethylene carbonate.

The nonaqueous electrolyte solution containing at least one fluorine solvent has improved oxidation resistance.

As a result, even when the battery 10 is charged with a high voltage, the battery 10 can be stably operated.

In the battery in Embodiment 2, the electrolyte may be a solid electrolyte.

Examples of the solid electrolyte are an organic polymer solid electrolyte, an oxide solid electrolyte, and a sulfide solid electrolyte.

An example of the organic polymer solid electrolyte is a compound of a polymer compound and a lithium salt. An example of such a compound is lithium polystyrene sulfonate.

The polymer compound may have an ethylene oxide structure. A polymer compound having an ethylene oxide structure can contain a large amount of lithium salt. As a result, the ionic conductivity can be further increased.

Examples of the oxide solid electrolyte are (i) an NASICON solid electrolyte such as $LiTi_2(PO_4)_3$ or a substitute thereof;

(ii) a perovskite solid electrolyte such as $(LaLi)TiO_3$;

(iii) an LISICON solid electrolyte such as $Li_{14}ZnGe_4O_{16}$, $Li_4SiO_4$, $LiGeO_4$, or a substitute thereof;

(iv) a garnet solid electrolyte such as $Li_7La_3Zr_2O_2$ or a substitute thereof;

(v) $Li_3N$ or an H-substitute thereof; and (vi) $Li_3PO_4$ or an N-substitute thereof.

Examples of the sulfide solid electrolyte are $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. When the solid electrolyte is a sulfide solid electrolyte, LiX(X is F, C, Br, or I), $MO_y$, or $Li_xMo_y$, (M is P, Si, Ge, B, Al, Ga, or In, and x and y are each independently a natural number) may be added to the sulfide solid electrolyte.

Among them, sulfide solid electrolytes have high moldability and high ionic conductivity. Accordingly, the energy density of the battery can be further improved by using a sulfide solid electrolyte as the solid electrolyte.

Among sulfide solid electrolytes, in particular, $Li_2S$—$P_2S_5$ has high electrochemical stability and high ionic conductivity. Accordingly, when $Li_2S$—$P_2S_5$ is used as the solid electrolyte, the energy density of the battery can be further improved.

The solid electrolyte layer containing a solid electrolyte may further contain the above-described nonaqueous electrolyte solution.

Since the solid electrolyte layer contains a nonaqueous electrolyte solution, movement of lithium ions between the active material and the solid electrolyte is easy. As a result, the energy density of the battery can be further improved.

The solid electrolyte layer may contain a gel electrolyte or an ionic liquid.

An example of the gel electrolyte is a polymer material impregnated with a nonaqueous electrolyte solution. Examples of the polymer material are polyethylene oxide, polyacrylonitrile, polyvinylidene fluoride, and polymethyl acrylate. Another example of the polymer material is a polymer having an ethylene oxide bond.

Examples of the cation contained in the ionic liquid are (i) a cation of an aliphatic chain quaternary ammonium salt such as tetraalkylammonium;

(ii) a cation of an aliphatic chain quaternary phosphonium salt such as tetraalkylphosphonium;

(iii) an aliphatic cyclic ammonium such as pyrrolidinium, morpholinium, imidazolinium, tetrahydropyrimidinium, piperazinium, and piperidinium; and (iv) a nitrogen-containing heterocyclic aromatic cation such as pyridinium and imidazolium.

The anion constituting the ionic liquid is $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, or $C(SO_2CF_3)_3^-$. The ionic liquid may contain a lithium salt.

Examples of the lithium salt are $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. As the lithium salt, one lithium salt selected from these lithium salts can be used alone. Alternatively, as the lithium salt, a mixture of two or more lithium salts selected from these lithium salts can be used. The concentration of the lithium salt is within a range of, for example, 0.5 to 2 mol/L.

Regarding the shape of the battery in Embodiment 2, the battery is a coin type battery, a cylindrical type battery, a square type battery, a sheet type battery, a button type battery (i.e., button type cell), a flat type battery, or a stacked type battery.

EXAMPLES

Example 1

Production of Positive Electrode Active Material

A mixture of LiF, $Li_2MnO_3$, $LiMnO_2$, $LiCoO_2$, and $LiNiO_2$ was prepared such that the Li/Mn/Co/Ni/O/F molar ratio was 1.0/0.54/0.13/0.13/1.9/0.1.

The mixture was put in a container having a volume of 45 mL together with an appropriate amount of zirconia balls having a diameter of 3 mm, followed by sealing in an argon glove box. The container used was of made of zirconia.

Subsequently, the container was taken out from the argon glove box. The mixture contained in the container was treated with a planetary ball mill at 600 rpm for 30 hours in an argon atmosphere to produce a precursor.

The resulting precursor was subjected to powder X-ray diffraction measurement.

Based on the result of the powder X-ray diffraction measurement, the space group of the precursor was specified as Fm-3m.

Subsequently, $LiOH-H_2O$ was added to the resulting precursor such that the molar ratio of Li to (Mn+Co+Ni) was 1.5. The Li/Mn/Co/Ni/O/F molar ratio was changed to 1.2/0.54/0.13/0.13/1.9/0.1 by the addition of LiOH-H$_2$O. Subsequently, the precursor was heat treated at 500° C. for 2 hours in an air atmosphere. A positive electrode active material of Example 1 was thus obtained.

The resulting positive electrode active material was subjected to powder X-ray diffraction measurement.

FIG. 2 shows the results of the powder X-ray diffraction measurement.

The positive electrode active material of Example 1 was also subjected to electron diffraction measurement. Based on the results of the powder X-ray diffraction measurement and the electron diffraction measurement, the crystal structure of the positive electrode active material of Example 1 was analyzed.

As a result, it was judged that the positive electrode active material of Example 1 was a three-phase mixture including a phase belonging to space group C2/m, a phase belonging to space group R-3m, and a phase belonging to space group Fm-3m.

The integrated intensity of an X-ray diffraction peak was calculated from the result of the powder X-ray diffraction measurement with an X-ray diffractometer (manufactured by Rigaku Corporation) by the software (trade name: PDXL) attached to the X-ray diffractometer. The integrated intensity ratio $I_{(18°-20°)}/I_{(43°-46°)}$ and the integrated intensity ratio $I_{(20°-23°)}/I_{(18°-20°)}$ in the positive electrode active material of Example 1 were 1.16 and 0.12, respectively.

Production of Battery

Subsequently, 70 parts by mass of the positive electrode active material of Example 1, 20 parts by mass of acetylene black, 10 parts by mass of polyvinylidene fluoride (hereinafter, referred to as "PVDF"), and an appropriate amount of N-methyl-2-pyrrolidone (hereinafter, referred to as "NMP") were mixed to prepare a positive electrode mixture slurry. The acetylene black functioned as a conductive agent. The polyvinylidene fluoride functioned as a binding agent.

The positive electrode mixture slurry was applied to one surface of a positive electrode current collector made of aluminum foil having a thickness of 20 pm.

The positive electrode mixture slurry was dried and rolled to obtain a positive electrode plate having a thickness of 60 pm including a positive electrode active material layer.

The resulting positive electrode plate was punched to obtain a circular positive electrode having a diameter of 12.5 mm.

Lithium metal foil having a thickness of 300 pm was punched to obtain a circular negative electrode having a diameter of 14 mm.

Separately, fluoroethylene carbonate (hereinafter, referred to as "FEC"), ethylene carbonate (hereinafter, referred to as "EC"), and ethyl methyl carbonate (hereinafter, referred to as "EMC") were mixed at a volume ratio of 1:1:6 to obtain a nonaqueous solvent.

LiPF$_6$ was dissolved in this nonaqueous solvent at a concentration of 1.0 mol/L to obtain a nonaqueous electrolyte solution.

A separator was impregnated with the resulting nonaqueous electrolyte solution. The separator used was a product of Celgard LLC (P/No. 2320, thickness: 25 pm). The separator was a three-layer separator composed of a polypropylene layer, a polyethylene layer, and a polypropylene layer.

A coin type battery having a diameter of 20 mm and a thickness of 3.2 mm was produced using the above-described positive electrode, negative electrode, and separator in a dry box maintained at a dew point of −50° C.

Example 2

Production of Positive Electrode Active Material

A mixture of LiF, Li$_2$MnO$_3$, LiMnO$_2$, LiCoO$_2$, and LiNiO$_2$ was prepared such that the Li/Mn/Co/Ni/O/F molar ratio was 0.2/0.54/0.13/0.13/1.9/0.1.

The mixture was put in a container having a volume of 45 mL together with an appropriate amount of zirconia balls having a diameter of 3 mm, followed by sealing in an argon glove box. The container used was of made of zirconia.

Subsequently, the container was taken out from the argon glove box. The mixture contained in the container was treated with a planetary ball mill at 600 rpm for 30 hours in an argon atmosphere to produce a precursor.

The resulting precursor was subjected to powder X-ray diffraction measurement.

Based on the result of the powder X-ray diffraction measurement, the space group of the precursor was specified as Fm-3m.

Subsequently, LiOH-H$_2$O was added to the resulting precursor such that the molar ratio of Li to (Mn+Co+Ni) was 1.5. The Li/Mn/Co/Ni/O/F molar ratio was changed to 1.2/0.54/0.13/0.13/1.9/0.1 by the addition of LiOH-H$_2$O. Subsequently, the precursor was heat treated at 500° C. for 2 hours in an air atmosphere. A positive electrode active material of Example 2 was thus obtained.

The positive electrode active material of Example 2 was subjected to powder X-ray diffraction measurement.

The positive electrode active material of Example 2 was also subjected to electron diffraction measurement. Based on the results of the powder X-ray diffraction measurement and the electron diffraction measurement, the crystal structure of the positive electrode active material of Example 2 was analyzed.

As a result, it was judged that the positive electrode active material of Example 2 was a three-phase mixture including a phase belonging to space group C2/m, a phase belonging to space group R-3m, and a phase belonging to space group Fm-3m.

The integrated intensity of an X-ray diffraction peak was calculated from the result of the powder X-ray diffraction measurement with an X-ray diffractometer (manufactured by Rigaku Corporation) by the software (trade name: PDXL) attached to the X-ray diffractometer. The integrated intensity ratio $I_{(18°-20°)}/I_{(43°-46°)}$ and the integrated intensity ratio $I_{(20°-23°)}/I_{(18°-20°)}$ in the positive electrode active material of Example 2 were 1.14 and 0.12, respectively.

A coin type battery of Example 2 was produced as in Example 1 except that the positive electrode active material of Example 2 was used.

Examples 3 to 10

In Examples 3 to 10, positive electrode active materials were prepared as in Example 1 except the following items (i) and (ii):

(i) the mixing ratio of the mixture (i.e., the mixing ratio of Li/Me/O/F) was changed, and
(ii) the heating conditions were changed within a range of 500° C. to 900° C. and a range of 10 minutes to 10 hours.

Table 1 shows the average compositions of the positive electrode active materials of Examples 3 to 10.

Coin type batteries of Examples 3 to 10 were produced as in Example 1 except that the positive electrode active materials of Examples 3 to 10 were used.

Example 11

Production of Positive Electrode Active Material

A mixture of $Li_2MnO_3$, $LiMnO_2$, $LiCoO_2$, and $LiNiO_2$ was prepared such that the Li/Mn/Co/Ni/O molar ratio was 1.0/0.54/0.13/0.13/2.0.

The mixture was put in a container having a volume of 45 mL together with an appropriate amount of zirconia balls having a diameter of 3 mm, followed by sealing in an argon glove box. The container used was of made of zirconia.

Subsequently, the container was taken out from the argon glove box. The mixture contained in the container was treated with a planetary ball mill at 600 rpm for 30 hours in an argon atmosphere to produce a precursor.

The resulting precursor was subjected to powder X-ray diffraction measurement.

Based on the result of the powder X-ray diffraction measurement, the space group of the precursor was specified as Fm-3m.

Subsequently, $LiOH$—$H_2O$ was added to the resulting precursor such that the molar ratio of Li to (Mn+Co+Ni) was 1.5. The L/Mn/Co/Ni/O molar ratio was changed to 1.2/0.54/0.13/0.13/2.0 by the addition of $LiOH$—$H_2O$. Subsequently, the precursor was heat treated at 500° C. for 2 hours in an air atmosphere. A positive electrode active material of Example 11 was thus obtained.

The positive electrode active material of Example 11 was subjected to powder X-ray diffraction measurement.

The positive electrode active material of Example 11 was also subjected to electron diffraction measurement. Based on the results of the powder X-ray diffraction measurement and the electron diffraction measurement, the crystal structure of the positive electrode active material of Example 11 was analyzed.

As a result, it was judged that the positive electrode active material of Example 11 was a three-phase mixture including a phase belonging to space group C2/m, a phase belonging to space group R-3m, and a phase belonging to space group Fm-3m.

The integrated intensity of an X-ray diffraction peak was calculated from the result of the powder X-ray diffraction measurement with an X-ray diffractometer (manufactured by Rigaku Corporation) by the software (trade name: PDXL) attached to the X-ray diffractometer. The integrated intensity ratio $I_{(18°-20°)}/I_{(43°-46°)}$ and the integrated intensity ratio $I_{(20°-23°)}/I_{(18°-20°)}$ in the positive electrode active material of Example 11 were 1.21 and 0.24, respectively.

A coin type battery of Example 11 was produced as in Example 1 except that the positive electrode active material of Example 11 was used.

Comparative Example 1

In Comparative Example 1, a positive electrode active material having a composition represented by a chemical formula $LiCoO_2$ (i.e., lithium cobaltate) was prepared using a known procedure.

The resulting positive electrode active material was subjected to powder X-ray diffraction measurement.

The result of the powder X-ray diffraction measurement is shown in FIG. 2.

Based on the result of the powder X-ray diffraction measurement, the space group of the positive electrode active material of Comparative Example 1 was specified as space group R-3m.

The integrated intensity ratio $I_{(18°-20°)}/I_{(43°-46°)}$ and the integrated intensity ratio $I_{(20°-23°)}/I_{(18°-20°)}$ in the positive electrode active material of Comparative Example 1 were 1.27 and 0, respectively.

A coin type battery of Comparative Example 1 was produced as in Example 1 except that the positive electrode active material of Comparative Example 1 was used.

Evaluation of Battery

The battery of Example 1 was charged up to a voltage of 4.7 V at a current density of 0.5 $mA/cm^2$.

Subsequently, the battery of Example 1 was discharged down to a voltage of 2.5 V at a current density of 0.5 $mA/cm^2$.

The initial discharge capacity of the battery of Example 1 was 282 mAh/g.

The battery of Comparative Example 1 was charged up to a voltage of 4.3 V at a current density of 0.5 $mA/cm^2$.

Subsequently, the battery of Comparative Example 1 was discharged down to a voltage of 2.5 V at a current density of 0.5 $mA/cm^2$.

The initial discharge capacity of the battery of Comparative Example 1 was 150 mAh/g.

The initial discharge capacity of each of the coin type batteries of Examples 2 to 11 was similarly measured.

The following Tables 1 to 3 show the results of Examples 1 to 11 and Comparative Example 1.

TABLE 1

| | Average composition | x/y | α/β | (x + y)/(α + β) |
|---|---|---|---|---|
| Example 1 | $Li_{1.2}Mn_{0.54}Co_{0.13}Ni_{0.13}O_{1.9}F_{0.1}$ | 1.5 | 19 | 1.0 |
| Example 2 | $Li_{1.2}Mn_{0.54}Co_{0.13}Ni_{0.13}O_{1.9}F_{0.1}$ | 1.5 | 19 | 1.0 |
| Example 3 | $Li_{1.2}Mn_{0.54}Co_{0.13}Ni_{0.13}O_{1.9}F_{0.1}$ | 1.5 | 19 | 1.0 |
| Example 4 | $Li_{1.166}Mn_{0.5}Co_{0.167}Ni_{0.167}O_{1.9}F_{0.1}$ | 1.4 | 19 | 1.0 |
| Example 5 | $Li_{1.166}Mn_{0.5}Co_{0.167}Ni_{0.167}O_{1.9}F_{0.1}$ | 1.4 | 19 | 1.0 |
| Example 6 | $Li_{1.33}Mn_{0.67}O_{1.33}F_{0.67}$ | 2.0 | 2 | 1.0 |
| Example 7 | $Li_{1.2}Mn_{0.54}Co_{0.13}Ni_{0.13}O_{1.9}F_{0.1}$ | 1.5 | 19 | 1.0 |
| Example 8 | $Li_{1.2}Mn_{0.54}Co_{0.13}Ni_{0.13}O_{1.9}F_{0.1}$ | 1.5 | 19 | 1.0 |
| Example 9 | $Li_{1.4}Mn_{0.6}Co_{0.2}Ni_{0.2}O_{1.9}F_{0.1}$ | 1.4 | 19 | 1.2 |
| Example 10 | $Li_{1.33}Mn_{0.67}O_{1.33}F_{0.67}$ | 2.0 | 2 | 1.0 |
| Example 11 | $Li_{1.2}Mn_{0.54}Co_{0.13}Ni_{0.13}O_{2.0}$ | 1.5 | — | 1.0 |
| Comparative Example 1 | $LiCoO_2$ | 1.0 | — | 1.0 |

TABLE 2

| | First phase | Second phase | Third phase |
|---|---|---|---|
| Example 1 | C2/m | R-3m | Fm-3m |
| Example 2 | C2/m | R-3m | Fd-3m |
| Example 3 | C2/m | R-3m | Fd-3m |
| Example 4 | C2/m | R-3m | Fm-3m |
| Example 5 | C2/m | R-3m | Fd-3m |
| Example 6 | C2/m | R-3m | Fm-3m |
| Example 7 | C2/m | R-3m | Fd-3m |
| Example 8 | C2/m | R-3m | Fm-3m |
| Example 9 | C2/m | R-3m | Fd-3m |
| Example 10 | C2/m | R-3m | Fm-3m |
| Example 11 | C2/m | R-3m | Fd-3m |
| Comparative Example 1 | — | R-3m | — |

TABLE 3

|  | $I_{(18°-20°)}/I_{(43°-46°)}$ | $I_{(20°-23°)}/I_{(18°-20°)}$ | Initial discharge capacity (mAh/g) |
|---|---|---|---|
| Example 1 | 1.16 | 0.12 | 282 |
| Example 2 | 1.14 | 0.12 | 281 |
| Example 3 | 1.19 | 0.12 | 278 |
| Example 4 | 0.95 | 0.10 | 281 |
| Example 5 | 1.16 | 0.14 | 277 |
| Example 6 | 0.99 | 0.08 | 273 |
| Example 7 | 1.23 | 0.25 | 269 |
| Example 8 | 1.26 | 0.12 | 268 |
| Example 9 | 1.22 | 0.09 | 264 |
| Example 10 | 0.81 | 0.09 | 266 |
| Example 11 | 1.21 | 0.24 | 255 |
| Comparative Example 1 | 1.27 | 0 | 150 |

As shown in Tables 1 to 3, the batteries of Examples 1 to 11 each have an initial discharge capacity of 255 to 282 mAh/g.

That is, the initial discharge capacities of the batteries of Examples 1 to 11 are larger than that of the battery of Comparative Example 1.

A reason for this may be that in the batteries of Examples 1 to 11, the lithium composite oxide in the positive electrode active material includes a first phase having a crystal structure belonging to a monoclinic crystal, a second phase having a crystal structure belonging to a hexagonal crystal, and a third phase having a crystal structure belonging to a cubic crystal. It is inferred that, therefore, a large amount of Li can be inserted and released and the diffusibility of Li and the stability of the crystal structure are high. It is inferred that, consequently, the initial discharge capacity was considerably improved.

In Comparative Example 1, the crystal structure is a single phase of space group R-3m. The value of (x/y) is equal to 1. It is inferred that because of these reasons, the insertion amount and the release amount of Li at the time of charging and discharging and the stability of the crystal structure were reduced and the initial discharge capacity was considerably decreased.

As shown in Tables 1 to 3, the initial discharge capacity of the battery of Example 6 is smaller than that of the battery of Example 1.

A reason for this may be that in Example 6, the integrated intensity ratio $I_{(20°-23°)}/I_{(18°-20°)}$ is small compared with that in Example 1. It is inferred that, consequently, the abundance ratio of the first phase was small and the insertion amount and the release amount of Li at the time of charging and discharging were decreased. It is inferred that, consequently, the initial discharge capacity was decreased.

As shown in Tables 1 to 3, the initial discharge capacity of the battery of Example 7 is smaller than that of the battery of Example 1.

A reason for this may be that in Example 7, the integrated intensity ratio $I_{(18°-20°)}/I_{(43°-46°)}$ is large compared with that in Example 1. It is inferred that, consequently, the abundance ratio of the third phase was small and the stability of the crystal structure was reduced. Furthermore, another reason may be that in Example 7, the $I_{(20°-23°)}/I_{(18°-20°)}$ is large compared with that in Example 1. It is inferred that, consequently, the abundance ratio of the second phase was small and the diffusibility of Li at the time of charging and discharging was reduced. It is inferred the initial discharge capacity was decreased by these reasons.

As shown in Tables 1 to 3, the initial discharge capacity of the battery of Example 8 is smaller than that of the battery of Example 1.

A reason for this may be that in Example 8, the $I_{(18°-20°)}/I_{(43°-46°)}$ is large compared with that in Example 1. It is inferred that, consequently, the abundance ratio of the third phase was small and the stability of the crystal structure was reduced. It is inferred that, as a result, the initial discharge capacity was decreased.

As shown in Tables 1 to 3, the initial discharge capacity of the battery of Example 9 is smaller than that of the battery of Example 1.

A reason for this may be that in Example 9, the integrated intensity ratio $I_{(18°-20°)}/I_{(43°-46°)}$ is large compared with that in Example 1. It is inferred that, consequently, the abundance ratio of the third phase was small and the stability of the crystal structure was reduced. Furthermore, another reason may be that in Example 9, the integrated intensity ratio $I_{(20°-23°)}/I_{(18°-20°)}$ is small compared with that in Example 1. It is inferred that, consequently, the abundance ratio of the first phase was small and the insertion amount and the release amount of Li at the time of charging and discharging were decreased. It is inferred the initial discharge capacity was decreased by these reasons.

As shown in Tables 1 to 3, the initial discharge capacity of the battery of Example 10 is smaller than that of the battery of Example 1.

A reason for this may be that in Example 10, the integrated intensity ratio $I_{(18°-20°)}/I_{(43°-46°)}$ is small compared with that in Example 1. It is inferred, consequently, the abundance ratio of the total of the first phase and the second phase was small and the insertion amount, the release amount, and the diffusibility of Li at the time of charging and discharging were decreased. Furthermore, another reason may be that in Example 10, the integrated intensity ratio $I_{(20°-23°)}/I_{(18°-20°)}$ is small compared with that in Example 1. It is inferred that, consequently, the abundance ratio of the first phase was small and the insertion amount and the release amount of Li at the time of charging and discharging were decreased. It is inferred that the initial discharge capacity was decreased by these reasons.

As shown in Tables 1 to 3, the initial discharge capacity of the battery of Example 11 is smaller than that of the battery of Example 1.

A reason for this may be that in Example 11, the lithium composite oxide contained in the positive electrode active material does not contain a fluorine atom F. This causes destabilization of the crystal structure. It is inferred that as a result, the crystal structure is collapsed with the release of Li at the time of charging. It is inferred that, consequently, the initial discharge capacity was reduced.

The positive electrode active material of the present disclosure can be used for a battery, such as a secondary battery.

What is claimed is:
1. A positive electrode active material comprising:
a lithium composite oxide, wherein
the lithium composite oxide is a multiphase mixture including:
a first phase having a crystal structure belonging to a monoclinic crystal;
a second phase having a crystal structure belonging to a hexagonal crystal; and
a third phase having a crystal structure belonging to a cubic crystal,
the positive electrode active material satisfies the following mathematical expression (I):
$0.08 \leq$ integrated intensity ratio $I_{(20°-23°)}/I_{(18°-20°)} \leq 0.25$,
where the integrated intensity ratio $I_{(20°\text{-}23°)}/I_{(18°\text{-}20°)}$ is equal to a ratio of an integrated intensity $I_{(20°\text{-}23°)}$ to an integrated intensity $I_{(18°\text{-}20°)}$, the integrated intensity $I_{(18°\text{-}20°)}$ is an integrated intensity of a first maximum peak present in a diffraction angle 2θ range of greater than or equal to 18° and less than or equal to 20° in an X-ray diffraction pattern of the lithium composite oxide, and the integrated intensity $I_{(20°\text{-}23°)}$ is an integrated intensity of a second maximum peak present in a diffraction angle 2θ range of greater than or equal to 20° and less than or equal to 23° in the X-ray diffraction pattern of the lithium composite oxide, and the positive electrode active material satisfies the following mathematical expression (II):

0.81 ≤ integrated intensity ratio $I_{(18°\text{-}20°)}/I_{(43°\text{-}46°)}$ ≤ 1.26, where, the integrated intensity ratio $I_{(18°\text{-}20°)}/I_{(43°\text{-}46°)}$ is equal to a ratio of an integrated intensity $I_{(18°\text{-}20°)}$ to an integrated intensity $I_{(43°\text{-}46°)}$, the integrated intensity $I_{(18°\text{-}20°)}$ is an integrated intensity of a first maximum peak present in a diffraction angle 2θ range of greater than or equal to 18° and less than or equal to 20° in the X-ray diffraction pattern of the lithium composite oxide, and the integrated intensity $I_{(43°\text{-}46°)}$ is an integrated intensity of a third maximum peak present in a diffraction angle 2θ range of greater than or equal to 43° and less than or equal to 46° in the X-ray diffraction pattern of the lithium composite oxide.

2. The positive electrode active material according to claim 1, wherein
the monoclinic crystal is space group C2/m.

3. The positive electrode active material according to claim 1, wherein
the hexagonal crystal is space group R-3m.

4. The positive electrode active material according to claim 1, wherein
the cubic crystal is at least one space group selected from the group consisting of space group Fm-3m and space group Fd-3m.

5. The positive electrode active material according to claim 1, wherein
the integrated intensity ratio $I_{(20°\text{-}23°)}/I_{(18°\text{-}20°)}$ is greater than or equal to 0.10 and less than or equal to 0.14.

6. The positive electrode active material according to claim 1, wherein
the integrated intensity ratio $I_{(18°\text{-}20°)}/I_{(43°\text{-}46°)}$ is greater than or equal to 0.95 and less than or equal to 1.19.

7. The positive electrode active material according to claim 1, wherein
the lithium composite oxide contains Mn.

8. The positive electrode active material according to claim 1, wherein
the lithium composite oxide contains at least one selected from the group consisting of F, Cl, N, and S.

9. The positive electrode active material according to claim 8, wherein
the lithium composite oxide contains F.

10. The positive electrode active material according to claim 1, wherein
the lithium composite oxide has an average composition represented by a compositional formula (I): $Li_xMe_yO_\alpha Q_\beta$,
where,
Me is at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al;

Q is at least one selected from the group consisting of F, Cl, N, and S;

x is a value of greater than or equal to 1.05 and less than or equal to 1.5;

y is a value of greater than or equal to 0.6 and less than or equal to 1.0;

α is a value of greater than or equal to 1.2 and less than or equal to 2.0; and

β is a value of greater than or equal to 0 and less than or equal to 0.8.

11. The positive electrode active material according to claim 10, wherein
Me includes at least one selected from the group consisting of Mn, Co, Ni, Fe, Cu, V, Ti, Cr, and Zn.

12. The positive electrode active material according to claim 11, wherein
Me includes at least one selected from the group consisting of Mn, Co, and Ni.

13. The positive electrode active material according to claim 12, wherein
Me includes Mn.

14. The positive electrode active material according to claim 13, wherein
a molar ratio of Mn to Me is greater than or equal to 0.6.

15. The positive electrode active material according to claim 10, wherein
Q includes F.

16. The positive electrode active material according to claim 10, wherein
x is a value of greater than or equal to 1.166 and less than or equal to 1.4; and
y is a value of greater than or equal to 0.67 and less than or equal to 1.0.

17. The positive electrode active material according to claim 10, wherein
α is a value of greater than or equal to 1.33 and less than or equal to 2.0; and
β is a value of greater than or equal to 0 and less than or equal to 0.67.

18. The positive electrode active material according to claim 17, wherein
β is a value of greater than or equal to 0 and less than or equal to 0.67.

19. The positive electrode active material according to claim 18, wherein
α is a value of greater than or equal to 1.33 and less than or equal to 1.9; and
β is a value of greater than or equal to 0.1 and less than or equal to 0.67.

20. The positive electrode active material according to claim 10, wherein
a value of (x/y) is greater than or equal to 1.4 and less than or equal to 2.0.

21. The positive electrode active material according to claim 10, wherein
a value of (α/β) is greater than or equal to 2 and less than or equal to 19.

22. The positive electrode active material according to claim 10, wherein
a value of ((x+y)/(α+β)) is greater than or equal to 1.0 and less than or equal to 1.2.

23. The positive electrode active material according to claim 1, comprising:
the lithium composite oxide as a main component.

24. The positive electrode active material according to claim 1, wherein the multiphase mixture is a three-phase mixture composed of the first phase, the second phase, and the third phase.

25. A battery comprising:
a positive electrode containing the positive electrode active material according to claim 1;
a negative electrode, and
an electrolyte.

26. The battery according to claim 25, wherein
the negative electrode includes:
a negative electrode active material (i) capable of occluding and releasing lithium ions, and
at least one material (ii) selected from the group consisting of materials where lithium metal is dissolved from each of the materials into an electrolyte at the time of discharging and precipitates on the material at the time of charging, and
the electrolyte is a nonaqueous electrolyte.

27. The battery according to claim 25, wherein
the negative electrode includes:
a negative electrode active material (i) capable of occluding and releasing lithium ions, and
at least one material (ii) selected from the group consisting of materials where lithium metal is dissolved from each of the materials into an electrolyte at the time of discharging and precipitates on the material at the time of charging, and
the electrolyte is a solid electrolyte.

* * * * *